(12) United States Patent
Choi

(10) Patent No.: US 7,347,445 B2
(45) Date of Patent: Mar. 25, 2008

(54) VEHICLE AIRBAG DEVICE WITH AN AUXILIARY CHAMBER

(75) Inventor: Hyeong Ho Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/645,275

(22) Filed: Dec. 22, 2006

(65) Prior Publication Data

US 2007/0262570 A1    Nov. 15, 2007

(30) Foreign Application Priority Data

May 12, 2006  (KR) .................. 10-2006-0042873
Oct. 31, 2006  (KR) .................. 10-2006-0106444

(51) Int. Cl.
   *B60R 21/16* (2006.01)
(52) U.S. Cl. .................. 280/729; 280/731; 280/735
(58) Field of Classification Search ................ 280/735, 280/729, 734, 731
   See application file for complete search history.

(56) References Cited

U.S. PATENT DOCUMENTS

| | | | |
|---|---|---|---|
| 5,520,413 A | | 5/1996 | Mossi et al. |
| 5,626,359 A | * | 5/1997 | Steffens et al. ............. 280/735 |
| 5,722,686 A | * | 3/1998 | Blackburn et al. .......... 280/735 |
| 5,769,452 A | * | 6/1998 | Yoshida ...................... 280/735 |
| 5,951,038 A | | 9/1999 | Taguchi et al. |
| 6,139,052 A | * | 10/2000 | Preamprasitchai .......... 280/735 |
| 6,419,262 B1 | * | 7/2002 | Fendt et al. ................. 280/729 |
| 6,581,961 B1 | * | 6/2003 | Bowers ....................... 280/735 |
| 6,629,575 B2 | * | 10/2003 | Nikolov ....................... 180/282 |
| 2001/0033072 A1 | * | 10/2001 | Kumagai et al. ........ 280/730.1 |
| 2002/0020990 A1 | * | 2/2002 | Sinnhuber et al. .......... 280/729 |
| 2003/0034638 A1 | * | 2/2003 | Yoshida ...................... 280/729 |
| 2006/0279072 A1 | * | 12/2006 | Hanawa et al. ............. 280/729 |

FOREIGN PATENT DOCUMENTS

| | | |
|---|---|---|
| JP | 01-229741 | 9/1989 |
| JP | 02-038163 | 2/1990 |
| JP | 07-165008 | 6/1995 |
| JP | 09-183358 | 7/1997 |
| KR | 1998-052388 | 9/1998 |
| KR | 1998-083911 | 12/1998 |
| KR | 1020010063462 A | 7/2001 |

* cited by examiner

*Primary Examiner*—Toan To
(74) *Attorney, Agent, or Firm*—Morgan Lewis & Bockius LLP

(57) ABSTRACT

The present invention relates to a vehicle airbag device equipped with an auxiliary chamber that protects a passenger in case of car crash by the auxiliary chamber's inflating depending on the passenger seat location and whether the front seat passenger's seatbelt is fastened, regardless of a front seat passenger's height or age, with the airbag being formed to protect the passenger's head, chest and knees, and in which the left and right sides of the auxiliary chamber are first inflated and then the center is inflated by providing gas flow directed to both sides of the auxiliary chamber so as to minimize injuries to the passenger by minimizing unfolding pressure.

15 Claims, 6 Drawing Sheets

VEHICLE AIRBAG DEVICE WITH AN AUXILIARY CHAMBER

CROSS-REFERENCE TO RELATED APPLICATION

This application claims priority to and benefit of Korean Patent applications No. 10-2006-0042873, No. 10-2006-0106444 filed in the Korean Intellectual Property Office on May 12, 2006 and Oct. 31, 2006 the disclosures of which are incorporated herein by reference.

BACKGROUND OF THE INVENTION

1. Field of the Invention

The present invention relates to a vehicle airbag device equipped with an auxiliary chamber for protecting an infant, child, or small adult passenger in case of an accident. The airbag inflation in an accident is determined by the front passenger seat location and whether the front passenger seatbelt is fastened.

2. Description of the Related Art

In general, vehicle airbags are classified into driver's seat airbags, front passenger's seat airbag, and curtain airbags. The front passenger's seat airbag is mounted to protect the passenger sitting next to the driver, and airbag inflation is controlled according to the size of the front seat passenger.

Recent cars have no airbag to protect children, infants, and small adults sitting in the front passenger's seat in case of a car crash, and a remedy for this lack of protection is needed.

SUMMARY OF THE INVENTION

Accordingly, the present invention has been developed to solve the problems described above. The present invention provides a vehicle airbag device equipped with an auxiliary chamber to minimize the level of the damage from a car crash regardless of the age or height of a front seat passenger.

The present invention is a vehicle airbag device equipped with an auxiliary chamber in accordance with a preferred embodiment of the present invention comprising: an impact sensor for sensing an impact as a result of a car accident; a seat belt sensor for sensing whether a front passenger's seatbelt is fastened; a seat position sensor sensing the position of a front passenger's seat along a seat rail; first and second inflators for expelling gas; an airbag including a base chamber inflated by gas supplied by the first inflator and which has at least one inner vent hole on the same side of the airbag as the front passenger's seat, and an auxiliary chamber which is mounted between the front passenger's seat and the base chamber and is inflated by gas supplied by the second inflator entering the auxiliary chamber through the inner vent, and a control section which inflates the airbag based on the input signal from the impact sensor and controls the operation of the first inflator and the second inflator depending on whether the seat belt sensor senses that the front passenger's seatbelt is fastened and the seat position sensed from the seat position sensor.

The second inflator uses lower pressure gas than the first inflator.

A diaphragm is mounted between the base chamber and the auxiliary chamber in a longitudinal direction of the airbag.

A duct is composed of a first tube-shaped chamber part having one end integrally formed and inflated by a gate part of the second inflator and the other end in which a first hole is formed so that gas flow is directed into one side of the auxiliary chamber, and a second tube-shaped chamber part having an end in which a second hole is formed so that gas flow is directed into an opposite side of the auxiliary chamber.

The first and the second tube-shaped chamber section of the duct are the same size to allow the sides of the auxiliary chamber to inflate identically.

The duct is mounted to the center of an auxiliary chamber so that gas is supplied by the second inflator.

The first and second holes of the first and the second chamber sections are sewn to an inner part of an auxiliary chamber.

A coupling is sewn to the first and second chamber sections of the duct.

The coupling sewn to the first and second chamber sections of the duct may have a concave semicircular tip on the side facing the front passenger's seat and be sewn to the sides of the auxiliary chambers facing the base chamber.

The duct may be tube-shaped.

The base chamber has a larger volume than the auxiliary chamber, and the auxiliary chamber is formed to protect the passenger's head, chest and knees.

The base chamber and the auxiliary chamber are each provided with an outer vent hole in which gas provided by the first and second inflators can discharge from the base chamber and the auxiliary chamber.

The auxiliary chamber has a time delay after the base chamber is inflated, and is inflated toward the passenger.

The auxiliary chamber is inflated such that it is inclined from an upper side to a lower side in the direction away from the front seat passenger.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
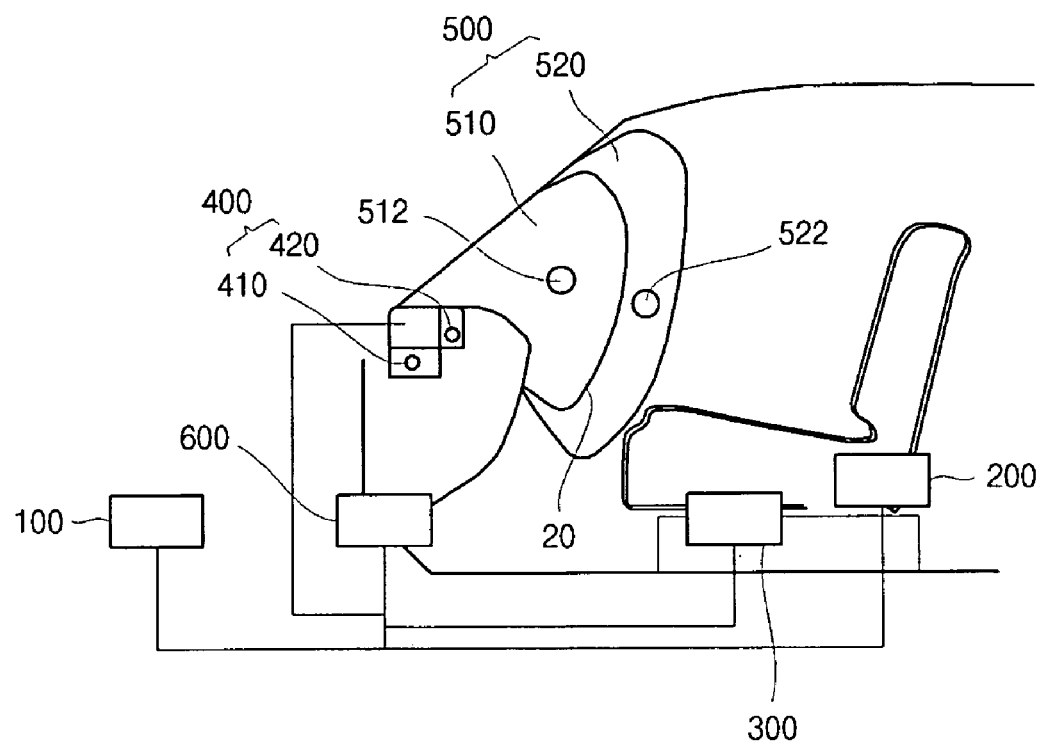
FIG. 1 shows a vehicle airbag device equipped with an auxiliary chamber according to the present invention.
Figure 2:
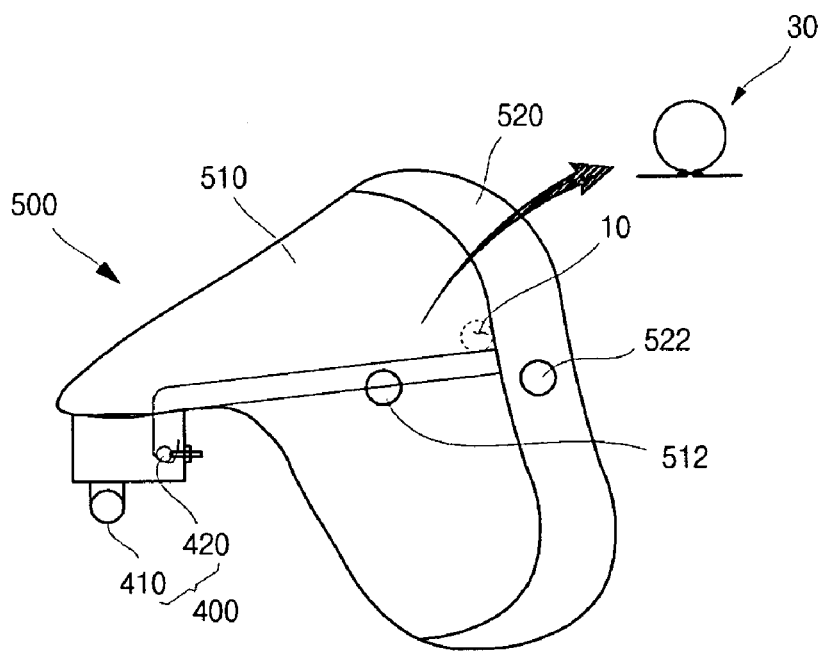
FIG. 2 is a sectional view of a vehicle airbag device equipped with an auxiliary chamber according to the present invention.

Hereinafter, preferred embodiments according to the present invention will be described with reference to the accompanying drawings.

Referring FIG. 1 to FIG. 6c, a vehicle airbag device equipped with an auxiliary chamber comprises an impact sensor 100 for sensing the impact applied to a vehicle body in case of a car accident; a seat belt sensor 200 for sensing whether the front passenger's seatbeat is fastened; a seat position sensor 300 for sensing the position of the front passenger's seat along a seat rail; an inflator unit 400 equipped with a first inflator 410 and a second inflator 420 which expel gas; an airbag including a base chamber which inflated by gas expelled by the first inflator 410 and which has at least one of an inner vent hole formed toward the front passenger's seat so as to allow gas flow, and an auxiliary chamber 520 which is mounted behind the base chamber 510 but accommodates the back of the base chamber 510 inwardly and is formed with an inner vent hole 10 by gas supplied by the second inflator 420; and a control section 600 which operates an airbag with the input signal sensed from the impact sensor 100 and controlling the operation of the first inflator 410 and the second inflator 420 depending on whether the seat belt sensor 200 senses that the front passenger's seatbelt is fastened and on the seat position sensed by the seat position sensor 300.

The second inflator 420 expels lower pressure gas than the first inflator 410.

A diaphragm 20 is mounted in a lengthwise direction of airbag 500 between the base camber 510 and the-auxiliary chamber.

Auxiliary chamber 520 includes a duct 30 for providing gas generated from the second inflator 420 so that the left and right sides of the auxiliary chamber 520 are first inflated and then the center of auxiliary chamber 520 is inflated.

Figure 3A:
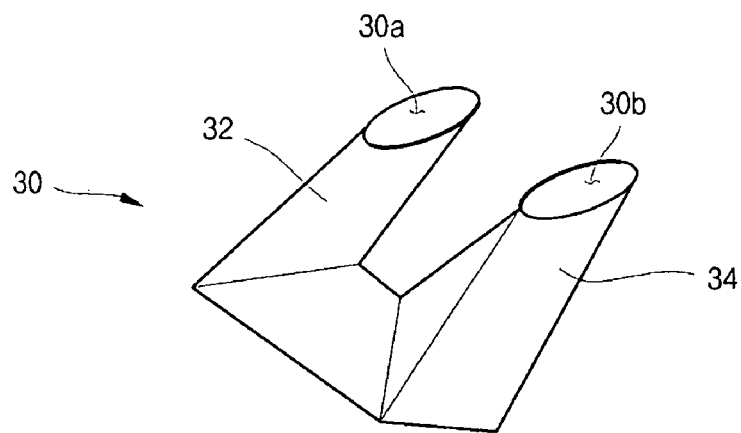
FIG. 3a to FIG. 3c show a duct which is mounted in a vehicle airbag device equipped with an auxiliary chamber according to the present invention.
Figure 3B:
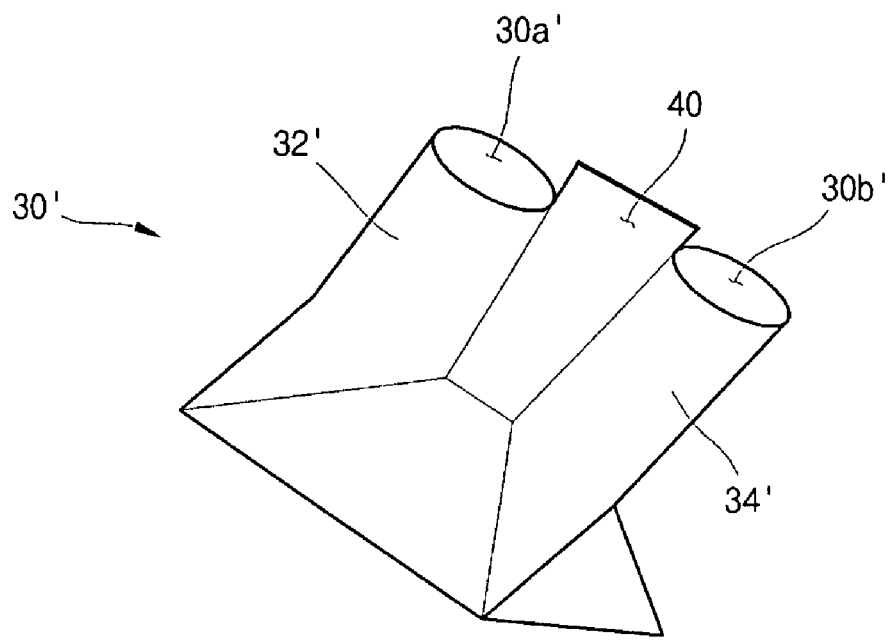
Figure 3C:
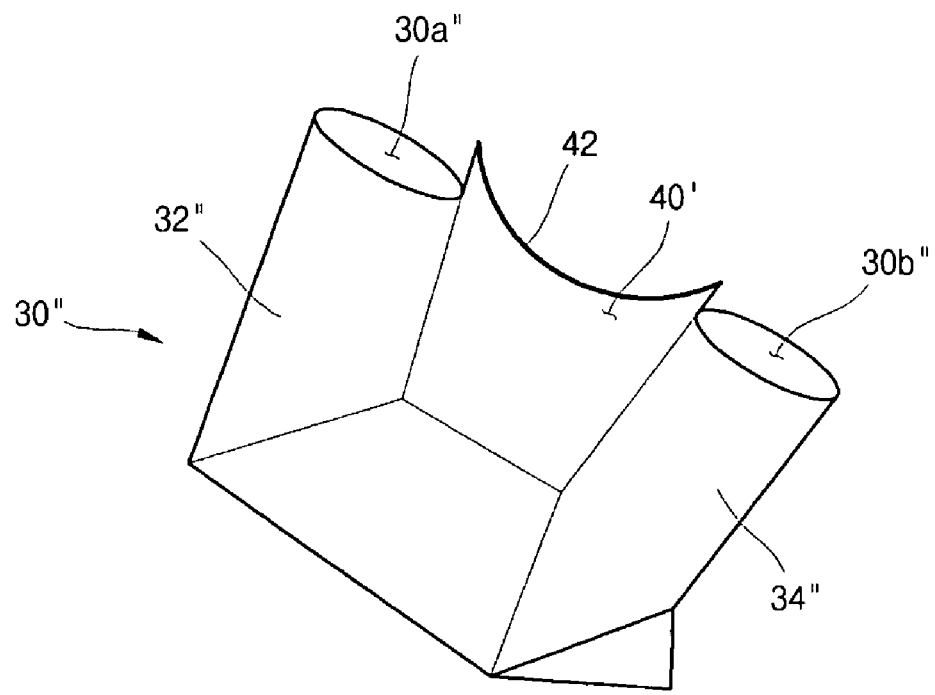

Duct 30 can have a variety of shapes, with examples shown in FIG. 3a to FIG. 3c.

Referring FIG. 3a, the duct 30 of the present invention includes a first tube-shaped chamber part 32 which is integrally inflated with a gate part of the second inflator 420 in which one end of duct 30 is mounted to an airbag module and the other end has a first hole 30a to enable gas flow to be directed into one side of an auxiliary chamber 520, and a second tube-shaped chamber part 34 which is integrally expanded with the gate part of the second inflator 420 and the other end has a second hole 30b to enable gas flow to be directed into the opposite side of an auxiliary chamber 520.

The first and the second tube-shaped chamber parts 32, 34 of the duct 30 inflate identically. Furthermore, the first and second holes 30a and 30b of the first and second chamber parts 32, 34 are sewn on the inner side of the fore part of auxiliary chamber 520.

Another embodiment of a duct according to the present invention will be explained referring to FIG. 3b.

Referring to FIG. 3b, a duct 30' of the present invention includes a first tube-shaped chamber part 32' which is integrally inflated by the gate part of the second inflator 420. One end of duct 30' is mounted to an airbag module and a first hole 30a' is formed on the other end to direct gas flow to one side of an auxiliary chamber, and a second tube-shaped chamber part 34' is integrally inflated by the gate part of second inflator 420 and in which the second hole 30b' is formed to direct gas flow to the opposite side of an auxiliary chamber 520.

A coupling 40 is located between the first and second tube-shaped chamber parts 32' and 34' of duct 30', and sewn to each of the first and second tube-shaped chamber parts 32' and 34' of duct 30'.

Another embodiment of a duct according to the present invention will be explained referring to FIG. 3c.

Referring FIG. 3c, a duct 30" of the present invention includes a first tube-shaped chamber part 32" which is integrally inflated by the gate part of the second inflator 420. One end of duct 30" is mounted to an airbag module and a first hole 30a" is formed on the other end to direct gas flow to one side of auxiliary chamber 520, and a second tube-shaped chamber part 34" is integrally inflated by the gate part of second inflator 420 and in which second hole 30b" is formed to direct gas flow to the opposite side of auxiliary chamber 520.

Coupling 40 is sewn to the inner side of auxiliary chamber 520 forming a concave semicircular part 42' on the side facing the front passenger's seat.

Coupling 40 is linked and mounted to the center of an auxiliary chamber 520 and can be mounted to admit gas from second inflator 420.

Duct 30 is linked and mounted to the center of an auxiliary chamber 520 and supplies gas from the second inflator 420.

Duct 30 is located behind the airbag housing equipped with an inflator 400 and is sewn on the airbag housing.

Base chamber 510 has a larger volume than auxiliary chamber 520, and auxiliary chamber 520 is formed to protect the passenger's head, chest and knee.

Base chamber 510 and auxiliary chamber 520 each have an outer vent hole through which gas provided by inflator 400 can discharge outside.

Auxiliary chamber 520 has a time delay after base chamber 510 is inflated, and inflates toward the passenger.

Auxiliary chamber 520 is inflated such that it is inclined from the upper side to the lower side in the direction away from the front seat passenger.

The operating state of a vehicle airbag device equipped with auxiliary chamber according to the present invention will be explained.

Referring to FIG. 1 to FIG. 6a, when a passenger 2 is an infant, child, or short adult, the seat is located toward the front of a seat rail. The position of seat 3 is sensed by a seat position sensor 300 and input to a control section 600, and the state of fastening of a seatbelt of passenger 2 is sensed by a seat belt sensor 200 and input to a control section 600.

The impact of an accident is sensed by an impact sensor 100 and the information is input to a control section 600. If seatbelt sensor 200 senses that the front seat passenger 2's seatbelt is not fastened and that seat 3 is positioned forward, control section 600 does not order both a base chamber 510 and an auxiliary chamber 520 to be inflated, but activates the first inflator 410 to enable only the base chamber 510 to be inflated and thereby the first inflator 410 expels gas.

Figure 4:
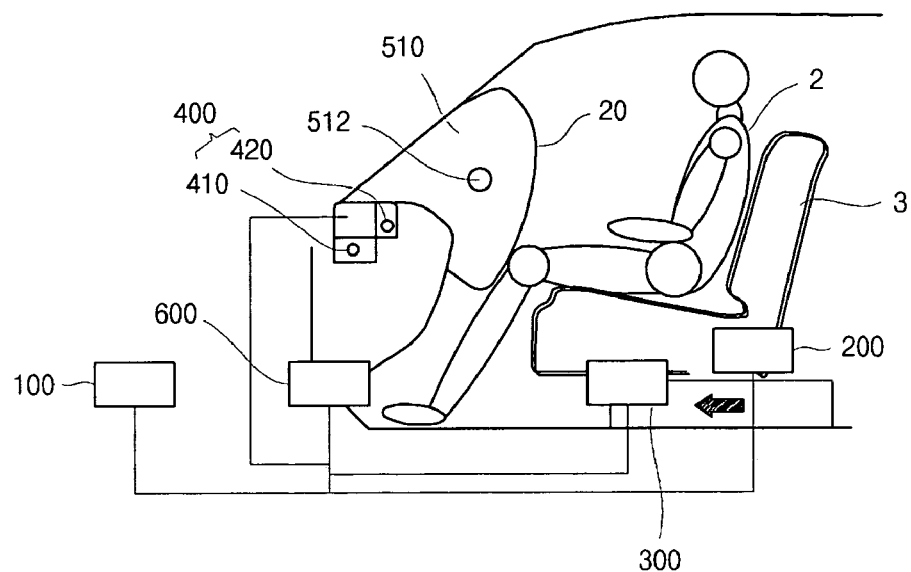
FIG. 4 to FIG. 5 are section views of an installed vehicle airbag device equipped with an auxiliary chamber according to the present invention.

Referring FIG. 4, the gas generated from the first inflator 410 is supplied to the inner part of base chamber 510 and is inflated toward a passenger to protect the passenger who is moved to the front of the vehicle, as shown in the drawing. Base chamber 510 is fully inflated and contacts passenger 2, and base chamber 510 is absorbing the impact energy of passenger 2. As the base chamber contacts the passenger's head or chest, gas is released from the airbag through an outer vent hole and the inflation of base chamber 510 minimizes passenger injuries.

Figure 5:
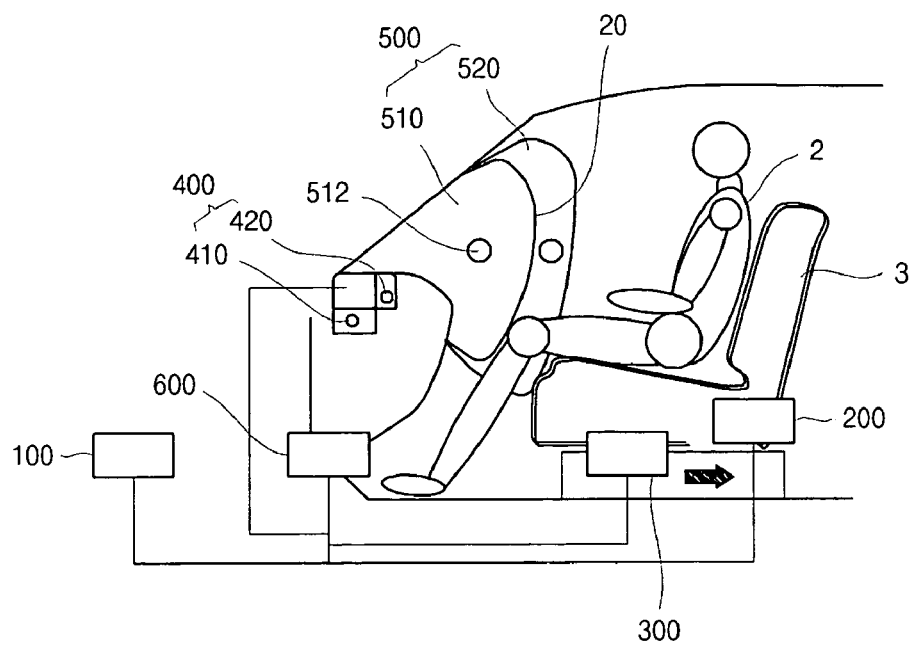

Referring to FIG. 5, another preferred embodiment of the present invention of a vehicle airbag device equipped with an auxiliary chamber will be explained.

Referring FIG. 5, when a tall passenger is in the front passenger's seat, the front passenger's seat is farther backward along a seat rail. The position of seat 3 is sensed by the seat position sensor 300 and input to a control section 600. The state of fastening of the front passenger's seatbelt is sensed by seat belt sensor 200 and input to a control section 600.

Upon the impact sensor 100 sensing a vehicle crash with the front passenger's seat forward and the front passenger's seatbelt is not fastened, control section 600 orders both a base chamber 510 and an auxiliary chamber 520 to be inflated.

Control section 600 orders both base chamber 510 and auxiliary chamber 520 to be operated but preferentially inflates base chamber 510, and has a time delay after first inflator 410 expels gas before auxiliary chamber 520 is inflated.

Gas generated from first inflator 410 is supplied to base chamber 510, and after a time delay, second inflator 420 expels gas to inflate the auxiliary chamber 520.

Figure 6A:
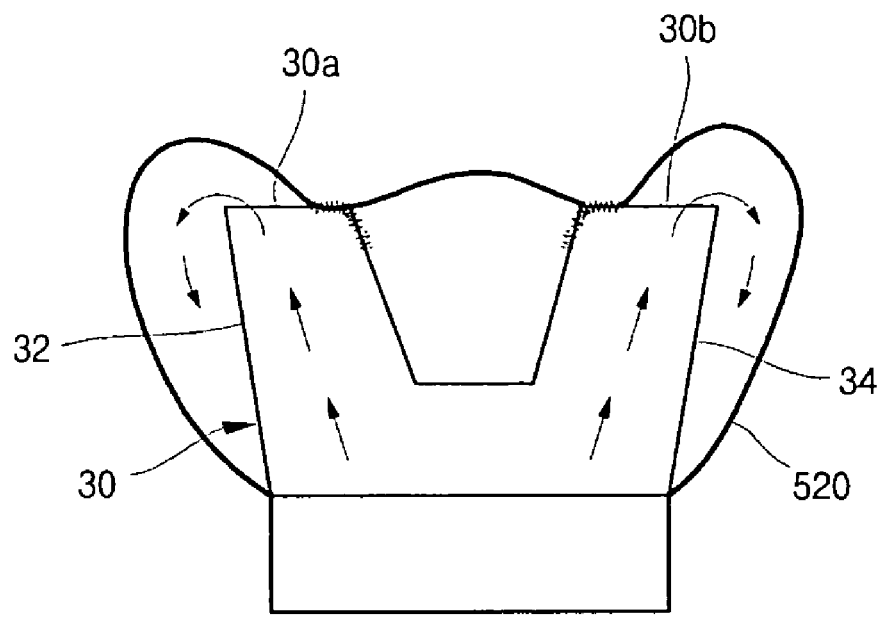
FIG. 6a to FIG. 6c are drawings of a duct which is mounted in a vehicle airbag device equipped with an auxiliary chamber according to the present invention.

Referring to FIG. 6a, gas generated from the second inflator 420 is supplied to the inside of the first and the second tube-shaped chambers 32, 34 of a duct 30 and is moved on the direction indicated by the arrow.

Outer sides of a column surface of the first and the second holes 30a, 30b which is formed in the first and the second chamber part 32, 34 is sewn on the inner side of an auxiliary chamber 520 so that the auxiliary chamber 520 operates with the gas supplied by the second inflator 420, described as above.

Figure 6B:
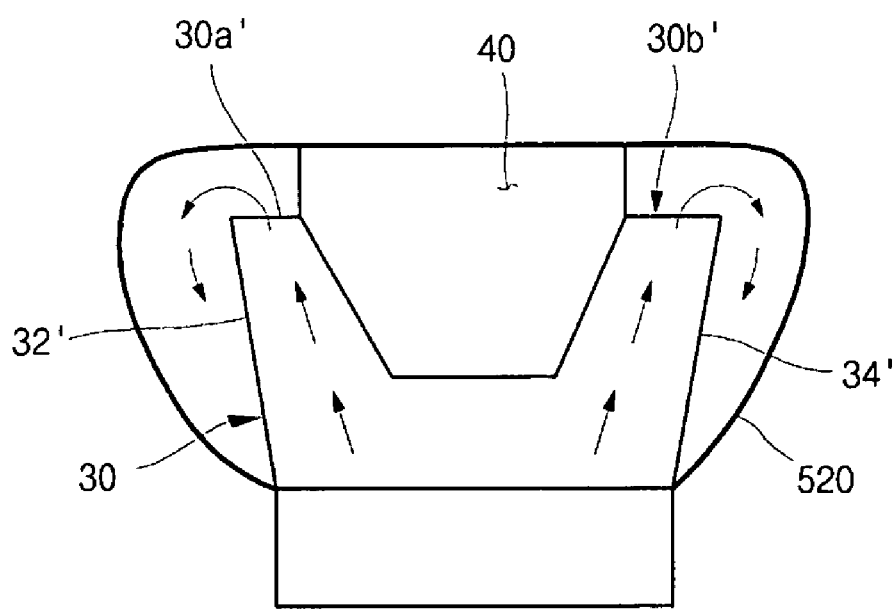

FIG. 6b is a drawing of another preferred embodiment of a duct, gas generated from second inflator 420 is supplied to the inner part of first and second tube-shaped chamber parts 32', 34' and is moved in the direction shown by the arrows. At this time, coupling 40 mounted between first and second tube-shaped chamber parts 32', 34' enables auxiliary chamber 520 to be ideally operated and simultaneously auxiliary chamber 520 operates as the gas provided by the first and the second holes 30a',30b' is moving to the left and the right of auxiliary chamber 520, as shown in the drawing. Coupling 40 is sewn to the inner fore part of the auxiliary chamber 520.

Figure 6C:
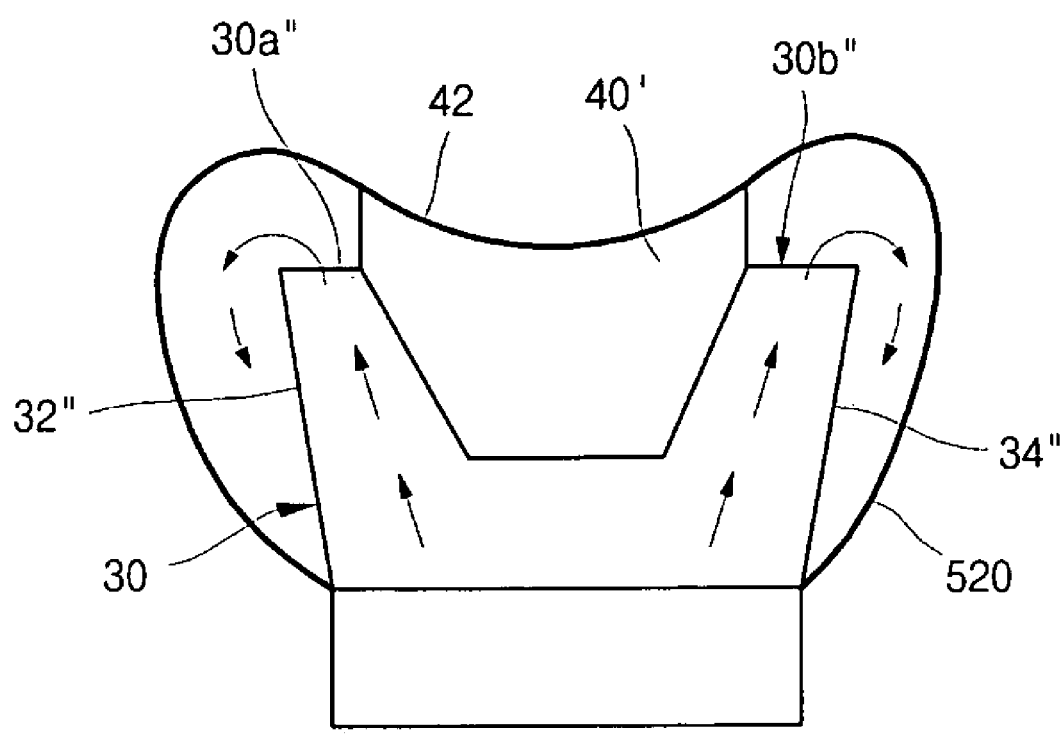

FIG. 6c is a drawing of another preferred embodiment of a duct. Gas generated from the second inflator 420 is supplied to the inner part of first and the second tube-shaped chamber parts 32", 34" and is moved in the direction shown by the arrows. At this time, coupling 40 mounted between the first and second tube-shaped chamber parts 32", 34" enables auxiliary chamber 520 to be ideally operated and simultaneously auxiliary chamber 520 operates as the gas provided by first and second holes 30a", 30b" is moving to the left and the right of the auxiliary chamber 520, as shown in the drawing.

A concave semicircular part 42 of the coupling 40 is sewn on the inner center side of an auxiliary chamber 520 so that both left and right ends of the auxiliary chamber 520 are first inflated and then the center part is inflated.

As above, the base chamber 510 and the auxiliary chamber 520 inflate toward a passenger 2 to protect the passenger 2 whose momentum is moving to the front of the vehicle. Fully inflated auxiliary chamber 520 contacts passenger 2 such that base chamber 510 and auxiliary chamber 520 absorb the impact energy of passenger 2. As auxiliary chamber 520 contacts passenger 2, gas from base chamber 520 is vented from airbag 500 through outer vent holes 512, 522 and injuries to passenger 2 are minimized.

Thus, the vehicle airbag of the present invention minimizes injuries to a passenger by a car crash regardless of the passenger's height or age.

Meanwhile, it will be appreciated by those skilled in the art that changes might be made in this embodiment without departing from the principles and spirit of the invention.

As described above, a vehicle airbag device equipped with an auxiliary chamber is effective in a car crash to protect a passenger in the front passenger's seat by minimizing the damage, regardless of the passenger's height or age.

Furthermore, it is effective in decreasing the risk to passengers by car crash by protecting the passenger's head, chest and knees.

Moreover, a duct prevents eccentric shape and asymmetric inflation of an airbag so that the airbag inflation can be stably operated.

As described above, the preferred embodiment of the present invention is disclosed through the descriptions and the drawings. The terms are used not to define the meanings thereof or restrict the scope of the present invention described in the claims but to explain the present invention. Therefore, it will be appreciated by those skilled in the art that changes might be made in this embodiment without departing from the principles and spirit of the invention, the scope of which is defined in the claims and their equivalents.

What is claimed is:

1. A vehicle airbag device equipped with an auxiliary chamber comprising:
    an impact sensor that detects an impact applied to a vehicle in the event of an accident;
    a seatbelt sensor for sensing whether a front passenger's seatbelt is fastened;
    a seat position sensor for sensing the position of a front passenger seat along a seat rail;
    an inflator unit having a first inflator and a second inflator which supply a gas;
    an airbag having a base chamber with at least one inner vent hole formed therein facing a passenger so that the airbag is unfolded and inflated by the gas supplied by the first inflator, and an auxiliary chamber which is installed on the side of the base chamber facing the passenger, and which receives the base chamber at an inner side of the auxiliary chamber and which is configured to receive the gas from the second inflator and to be connected with the inner vent hole; and
    a controller that operates the airbag according to a signal detected from the impact sensor, and that controls the operation of the first inflator and the second inflator according to the combination of whether the seatbelt sensor senses that the front passenger's seatbelt is fastened and the seat position detected by the seat position sensor,
    wherein the auxiliary chamber is provided with a duct for supplying the gas generated from the second inflator so that left and right parts of the airbag are unfolded first and a central part is unfolded last upon inflation of the airbag device.

2. The vehicle airbag device equipped with an auxiliary chamber according to claim 1, wherein the first inflator supplies gas at a higher pressure than the second inflator.

3. The vehicle airbag device equipped with an auxiliary chamber according to claim 1, wherein the duct is composed of a first tube-shaped chamber part having one end integrally formed and inflated by a gate part of the second inflator and the other end in which a first hole is formed so that gas flow is directed into one side of the auxiliary chamber, and a tube-shaped second chamber part having an end in which a second hole is formed so that gas flow is directed into an opposite side of the auxiliary chamber.

4. The vehicle airbag device equipped with an auxiliary chamber according to claim 3, wherein the first and second tube-shaped chamber parts of the duct are the same size to allow both sides of the auxiliary chamber to inflate equally.

5. The vehicle airbag device equipped with an auxiliary chamber according to claim 1, wherein the duct is connectively installed in the center of the auxiliary chamber, and thus the gas supplied from the second inflator is supplied.

6. The vehicle airbag device equipped with an auxiliary chamber according to claim 3, wherein the first and second holes of the first and second tube-shaped chamber parts are sewn to an inner part of the auxiliary chamber.

7. The vehicle airbag device equipped with an auxiliary chamber according to claim 3, wherein a coupling is provided between the first and second tube-shaped chamber parts, and the coupling is sewn to the first and second tube-shaped chamber parts.

8. The vehicle airbag device equipped with an auxiliary chamber according to claim 7, wherein the coupling has a concave semicircular part formed on the side facing the passenger, and the concave semicircular part is sewn to the inner part of the auxiliary chamber.

9. The vehicle airbag device equipped with an auxiliary chamber according to claim 7, wherein the coupling is sewn to the inner part of the auxiliary chamber.

10. The vehicle airbag device equipped with an auxiliary chamber according to claim 1, wherein the duct is tube-shaped.

11. The vehicle airbag device equipped with an auxiliary chamber according to claim 1, wherein the base chamber has a larger volume than the auxiliary chamber, and the auxiliary chamber is configured to protect a head, a chest and knees of the passenger.

12. The vehicle airbag device equipped with an auxiliary chamber according to claim 1, wherein the base chamber and the auxiliary chamber are each provided with an outer vent hole which is able to vent the gas supplied from the inflators out of the airbag.

13. The vehicle airbag device equipped with an auxiliary chamber according to claim 1, wherein the auxiliary chamber is inflated after the inflation of the base chamber.

14. The vehicle airbag device equipped with an auxiliary chamber according to claim 1, wherein the auxiliary chamber is inflated such that it is inclined from an upper side to a lower side in the direction away from the front seat passenger.

15. A vehicle airbag device equipped with an auxiliary chamber comprising:
    an impact sensor that detects an impact applied to a vehicle in the event of an accident;
    a seatbelt sensor for sensing whether a front passenger's seatbelt is fastened;
    a seat position sensor for sensing the position of a front passenger seat along a seat rail;
    an inflator unit having a first inflator and a second inflator which supply a gas;
    an airbag having a base chamber with at least one inner vent hole formed therein facing a passenger so that the airbag is unfolded and inflated by the gas supplied by the first inflator, and an auxiliary chamber which is installed on the side of the base chamber facing the passenger, and which receives the base chamber at an inner side of the auxiliary chamber and which is configured to receive the gas from the second inflator and to be connected with the inner vent hole; and
    a controller that operates the airbag according to a signal detected from the impact sensor, and that controls the operation of the first inflator and the second inflator according to the combination of whether the seatbelt sensor senses that the front passenger's seatbelt is fastened and the seat position detected by the seat position sensor wherein a diaphragm is installed between the base chamber and the auxiliary chamber, and the diaphragm is installed in a longitudinal direction of the airbag.

* * * * *